US010783465B1

(12) United States Patent
Wang

(10) Patent No.: US 10,783,465 B1
(45) Date of Patent: Sep. 22, 2020

(54) DYNAMIC PORT BANDWIDTH FOR DEDICATED PHYSICAL CONNECTIONS TO A PROVIDER NETWORK

(71) Applicant: Amazon Technologies, Inc., Reno, NV (US)

(72) Inventor: Shuguang Wang, Washington, DC (US)

(73) Assignee: Amazon Technologies, Inc., Seattle, WA (US)

( * ) Notice: Subject to any disclaimer, the term of this patent is extended or adjusted under 35 U.S.C. 154(b) by 1000 days.

(21) Appl. No.: 14/534,102

(22) Filed: Nov. 5, 2014

(51) Int. Cl.
*G06Q 10/06* (2012.01)
*H04L 12/26* (2006.01)
*G06Q 20/14* (2012.01)
*H04L 12/24* (2006.01)

(52) U.S. Cl.
CPC .......... *G06Q 10/06* (2013.01); *G06Q 20/145* (2013.01); *H04L 41/0896* (2013.01); *H04L 43/0882* (2013.01)

(58) Field of Classification Search
CPC ............ H04L 43/0882; H04L 41/0896; G06Q 20/145; G06Q 10/06
See application file for complete search history.

(56) References Cited

U.S. PATENT DOCUMENTS

| | | |
|---|---|---|
| 6,810,031 B1 | 10/2004 | Hegde et al. |
| 6,931,011 B2 | 8/2005 | Giacopelli et al. |
| 7,346,068 B1 | 3/2008 | Dan et al. |
| 8,169,912 B2 | 5/2012 | Lee et al. |
| 8,589,524 B1 * | 11/2013 | Sella .................... H04L 41/5041 709/221 |
| 9,417,997 B1 * | 8/2016 | DeSimone .............. G06F 12/02 |
| 9,521,085 B1 * | 12/2016 | Watson ............... H04L 67/1097 |
| 2006/0034334 A1 * | 2/2006 | Biederman ............. H04L 12/66 370/477 |
| 2007/0201380 A1 * | 8/2007 | Ma .......................... H04L 45/00 370/254 |

(Continued)

OTHER PUBLICATIONS

Niranjan Mysore, Radhika, George Porter, and Amin Vandat. "FasTrak: enabling express lanes in multi-tenant data centers." Proceedings of the ninth ACM conference on Emerging networking experiments and technologies. 2013.*

(Continued)

*Primary Examiner* — Asfand M Sheikh
(74) *Attorney, Agent, or Firm* — Robert C. Kowert; Kowert, Hood, Munyon, Rankin & Goetzel, P.C.

(57) ABSTRACT

A provider network may implement dynamic port bandwidth for dedicated physical connections to the provider network. A dedicated physical connection to the provider network may be established with a reserved port bandwidth according to which a client network may access resources implemented in the provider network. Utilization of the reserved port bandwidth for the dedicated physical connection may be monitored. A bandwidth modification event may be detected, and in response to detecting the bandwidth modification event, provider network routing may be modified to modify the reserved port bandwidth for the dedicated physical connection to the provider network. The resources in the provider network may then be accessed according to the adjusted reserved port bandwidth.

15 Claims, 9 Drawing Sheets

(56) References Cited

U.S. PATENT DOCUMENTS

| | | | |
|---|---|---|---|
| 2007/0263554 A1* | 11/2007 | Finn | H04L 45/48 370/256 |
| 2007/0280289 A1* | 12/2007 | Konda | H04L 47/724 370/468 |
| 2008/0037553 A1* | 2/2008 | Gilmartin | H04L 41/082 370/395.41 |
| 2008/0056122 A1* | 3/2008 | Madhi | H04L 45/245 370/216 |
| 2013/0166710 A1* | 6/2013 | Miller | H04L 41/18 709/223 |
| 2014/0040975 A1* | 2/2014 | Raleigh | H04L 41/5051 726/1 |
| 2014/0244851 A1* | 8/2014 | Lee | H04L 12/4641 709/228 |
| 2015/0110124 A1* | 4/2015 | Armstrong | H04L 49/70 370/412 |
| 2015/0263952 A1* | 9/2015 | Ganichev | H04L 45/745 370/389 |
| 2015/0312126 A1* | 10/2015 | Deshpande | H04L 43/0894 709/216 |
| 2016/0080280 A1* | 3/2016 | Ramachandran | G06F 16/285 370/235 |
| 2016/0080502 A1* | 3/2016 | Yadav | G06F 16/285 709/227 |
| 2017/0034052 A1* | 2/2017 | Chanda | H04L 12/4633 |
| 2017/0149688 A1* | 5/2017 | Chitti | H04L 47/781 |

OTHER PUBLICATIONS

Patel, Parveen, et al. "Ananta: Cloud scale load balancing." ACM SIGCOMM Computer Communication Review 43.4 (2013): 207-218.*

AWS, "AWS Direct Connect User Guide", API Version, Oct. 22, 2013, pp. 1-65.

* cited by examiner

DYNAMIC PORT BANDWIDTH FOR DEDICATED PHYSICAL CONNECTIONS TO A PROVIDER NETWORK

BACKGROUND

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each virtual machine being a software simulation acting as a distinct logical computing system that provides users with the illusion that they are the sole operators and administrators of a given hardware computing resource, which also provides application isolation and security among the various virtual machines. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Virtualization technologies have given rise to provider networks, which offer various services or resources to customers via network connections. As the amount of data, transactions, and other interactions with provider networks increase, so too do the various connection requirements for customers of provider networks. Some customers, may wish to take advantage of private or direct connections to provider networks, rather than utilizing publicly available connections (e.g., via the Internet). In this way, the connections between these customers and provider networks can be optimized for performance and increased utilization of provider network resources. Virtualization techniques may even be applied to private or direct connections to provider networks, modifying or configuring the connections to provider networks according to current customer needs.

Figure 1:
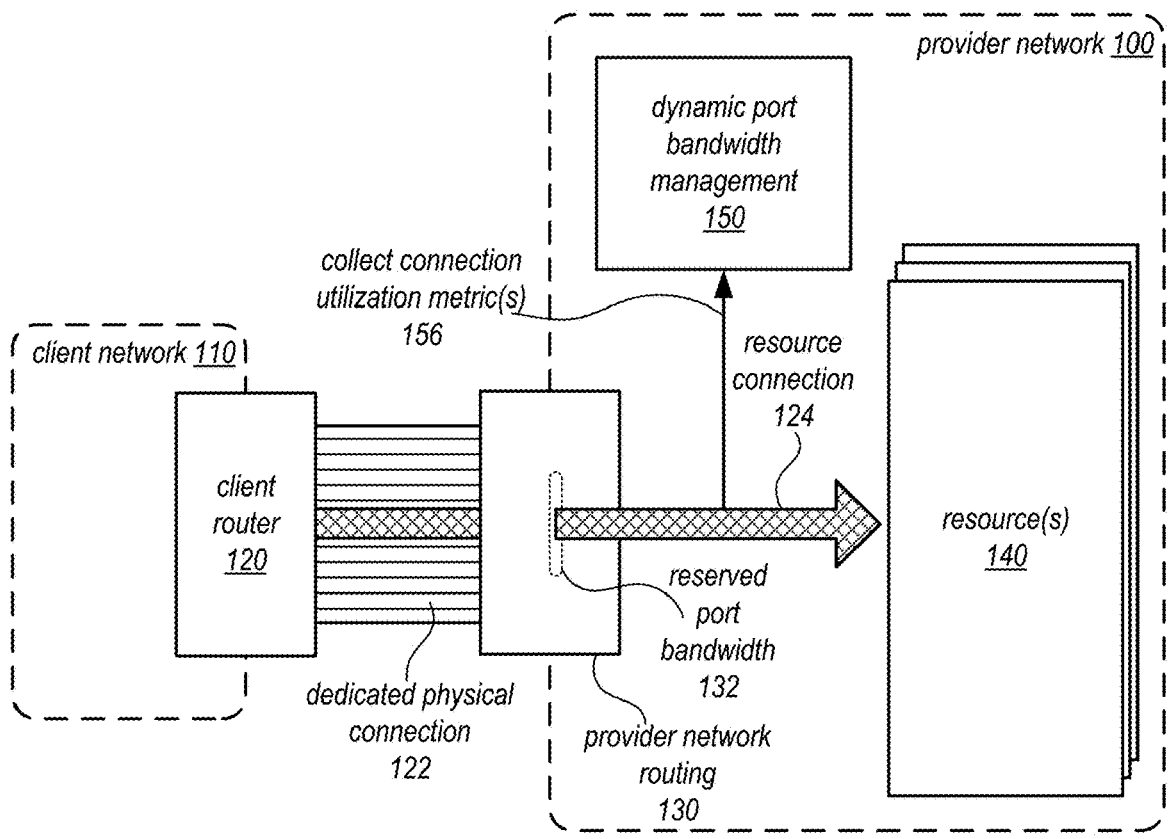
FIG. 1 is a series of block diagrams illustrating dynamic port bandwidth for dedicated physical connections to a provider network, according to some embodiments.
Figure 1:
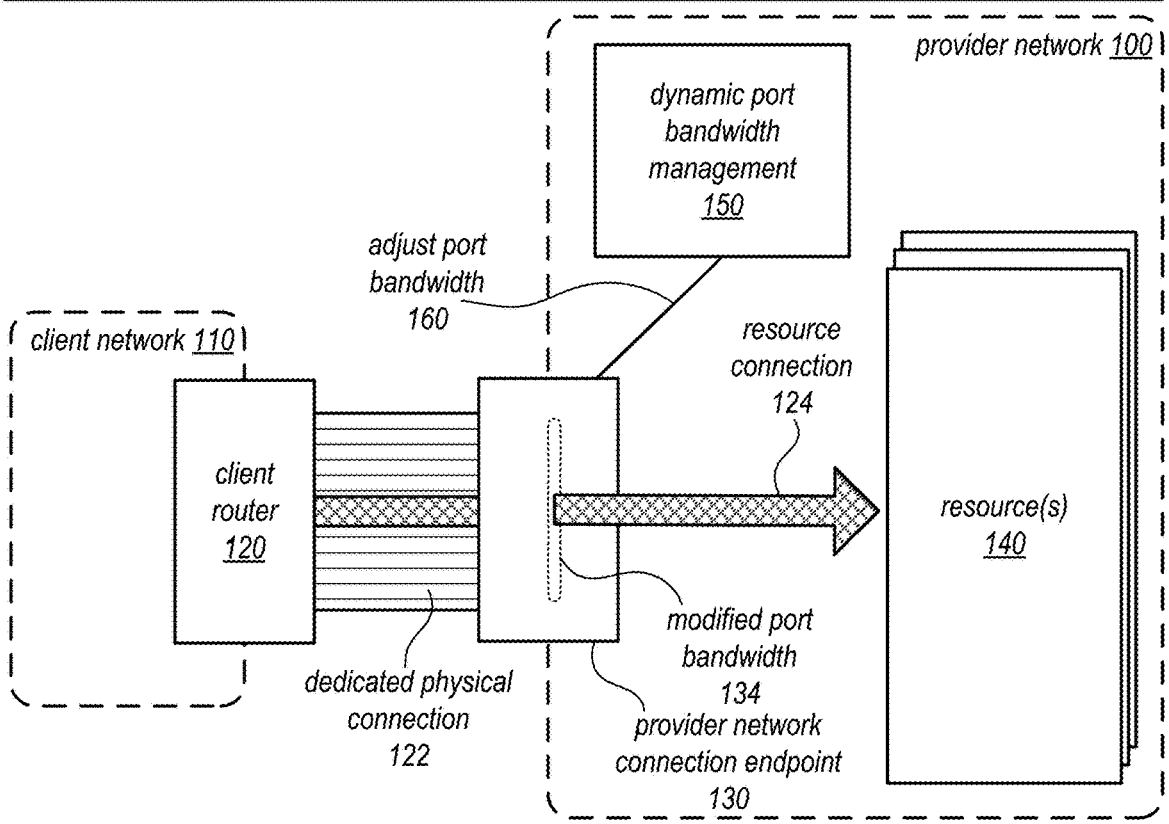

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement providing dynamic port bandwidth for a dedicated physical connection into a provider network, according to some embodiments. A provider network may supply clients, operators, or other customers with access to and/or control of one or more computing resources. These resources may include various types of computing systems or devices configured for communication over a network. For example, in some embodiments, a provider network may provide virtual computing resources to clients, users, or other type of customers, in the form of reserved compute instances (e.g., a virtual machine acting as a distinct logical computing system that provides users with the illusion that they are the sole operators and administrators of a given hardware computing resource). Customers of the provider network may reserve (i.e., purchase or buy) one or more compute resources (such as compute instances) or utilize other resources to perform various functions, services, techniques, and/or applications.

A given provider network may typically include several large data centers hosting various resource pools, such as collections of physical and/or virtualized computer servers, storage devices, networking equipment and the like, needed to implement, configure and distribute the infrastructure and services offered by the provider. In order to extend the geographical areas over which its services can be accessed with desired levels of performance, reliability and security, an operator of a provider network may establish private or dedicated network paths between its data centers and one or more routers that may be physically located at an external facility. The facilities at which these routers may be housed are sometimes referred to as "router co-location facilities", as they may sometimes house routers and other network equipment owned and/or managed by business entities other than the provider network's operator. In at least some embodiments, a given co-location facility may include a router belonging to or managed by the provider network operator, linked by a dedicated physical connection to another router or group of routing resources/devices belonging to or owned by an entity (i.e. a customer of the provider network) operating a client network that is external to the provider network.

In at least some embodiments, the dedicated physical connection may be initially or eventually connected physically to multiple routing resources (e.g., via various switches and/or other network traffic controllers/devices). Whether a single routing resource, or multiple routing resources are used, a single logical endpoint for the dedicated physical connect may be implemented, so that from the perspective of the client network the dedicated physical connection appears to be connected to a single routing resource (e.g., a single edge router), in various embodiments. Port bandwidth may be reserved for the dedicated physical connection in order to provide bandwidth for accessing the provider network for any traffic communicated along the dedicated physical connection. For instance, a 10 Gbps (gigabytes per second) reserved port bandwidth may ensure that the client network may access resources in the provider network at least up to 10 Gbps. Reserving port bandwidth for the dedicated physical connection may guarantee a particular level of performance for accessing the provider network from the client network.

Various systems, components, and/or devices implemented within the client network may utilize the dedicated physical connection for traffic between provider network resources assigned to the customer (such as compute instances, storage service nodes and the like) and external resources located outside the provider network. Resource connections may be established over dedicated physical connections between a client network and a provider network in order to connect these various systems, components, and/or devices of the client network to resources implemented within the provider network for the client network. Resource connections over the dedicated physical connection may be implemented in various ways. For example, the entire dedicated physical connection may be utilized to connect to resources within the provider network. However, in at least some embodiments, one or multiple virtual connections may be implemented to provide resource connections over the dedicated physical connection to resources.

A virtual connection, which may also be referred to as a virtual interface, may provide a logically isolated network path that enables connectivity over the dedicated physical connection between some set of external devices in a client network and some set of provider network resources. Virtual connections of several different types may be configurable in some embodiments, depending on the desired extent of network isolation and network address visibility of the devices to be connected. Some provider network resources may be publicly accessible (e.g., through alternative network paths such as through public networks like the Internet connected to the provider network). For more restrictive resource access scenarios, a provider network may support establishment of isolated virtual networks on behalf of various customers, in some embodiments, for instance.

An isolated virtual network (which may also be referred to in some environments as a virtual private cloud or VPC) may comprise a collection of computing and/or other resources in a logically isolated section of the provider network, over which the entity operating the client network is granted substantial control with respect to networking configuration. In some embodiments, for example, a customer may select the IP (Internet Protocol) address ranges to be used for the isolated virtual network resources, manage the creation of subnets within the isolated virtual network, and the configuration of route tables, gateways, etc. for the isolated virtual network. For at least some of the devices within an isolated virtual network in some embodiments, the network addresses may not be visible outside the isolated virtual network, at least by default. In order to enable connectivity between an isolated virtual network and the customer's client network (e.g., devices at the customer's data center or office premises) via a dedicated physical connection, a virtual connection that is configured for use with private addresses (and is therefore may be termed a private virtual connection) and a virtual private gateway may be set up. A customer-side gateway (e.g., for traffic directed to or from the customer's external network) may also have to be set up in some implementations. In some embodiments one or more VPNs (virtual private network) may be configured between the customer's isolated virtual network and external networks (such as the customer's office network or the customer's data centers). In at least some embodiments, such VPNs may utilize secure networking protocols such as IPSec (Internet Protocol Security), SSL/TLS (Secure Sockets Layer/Transport Layer Security), DTLS (Datagram Transport Layer Security) and the like.

Providing virtual connections into a provider network allows customers of the provider network to flexibly utilize a dedicated physical connection into the provider network. Multiple different virtual connections may be established that communicate with different resources for various different functions. Some virtual connections may be to publicly available services, while other virtual connections on the same dedicated physical connection may be to resources in isolated virtual networks, as described above. This flexibility may increase the number of virtual connections over a single dedicated physical connection.

However, even implementing multiple virtual connections (as opposed to utilizing a single resource connection), the port bandwidth reserved for the dedicated physical connection may limit the total utilization of the dedicated physical connection into the provider network. Typically, such port bandwidth reservations may be statically defined for a client network. Such implementations pose burdens on customers of a client network to provision or request enough reserved port bandwidth to satisfy the many possible needs or utilization of the dedicated physical connections. Moreover, over provisioning port bandwidth for client networks may lead to waste both for the client network and the provider network (which could potentially offer unused port bandwidth to other client networks).

Provider networks may implement dynamic port bandwidth reservations for dedicated physical connections, in various embodiments. In this way, client networks may obtain reserved port bandwidth that better fits the actual bandwidth needs for the client network to access resources in the provider network. Moreover, the provider network may more efficiently allocate port bandwidth to client networks, increasing the number of dedicated physical connections that may be implemented to the provider network. FIG. 1 is a series of block diagrams illustrating dynamic port bandwidth for dedicated physical connections to a provider network, according to some embodiments. As illustrated in scene 102, provider network 100 may have established a dedicated physical connection 122 with client network 110. A dedicated physical connection 122 between client router 120 and provider network routing 130 may allow traffic to pass between client network 110 and provider network 100. As part of establishing the dedicated physical connection, port bandwidth may be reserved 132 for the dedicated physical connection 122. A resource connection 124 may also then be established to allow client network 110 to access resource(s) 140 via the particular network path provided by the resource connection 124. Access of resource(s) 140 via resource connection 124 may be provided according to reserved port bandwidth 132.

Provider network 100 may implement dynamic port bandwidth manager 150 (or some similar component or set of components, systems or devices) which may modify the port bandwidth reserved 132 for dedicated physical connection 122. As illustrated in scene 102, utilization metrics for the connection 156 may be collected which indicate the utilization of reserved port bandwidth 132 for dedicated physical connection 122. Monitoring this utilization, dynamic port bandwidth manager may detect a bandwidth modification event for the dedicated physical connection 122. For example, utilization of reserved port bandwidth may cross above (or below) some threshold, such as 90%, triggering a bandwidth modification event. In some embodiments, bandwidth modification events may be triggered in response to provider events, whether based on monitoring the utilization of port bandwidth reservations for multiple dedicated physical connections at provider network routing 130, or in response to other events at the provider network (such as adding additional provider network routing resources).

Figure 3:
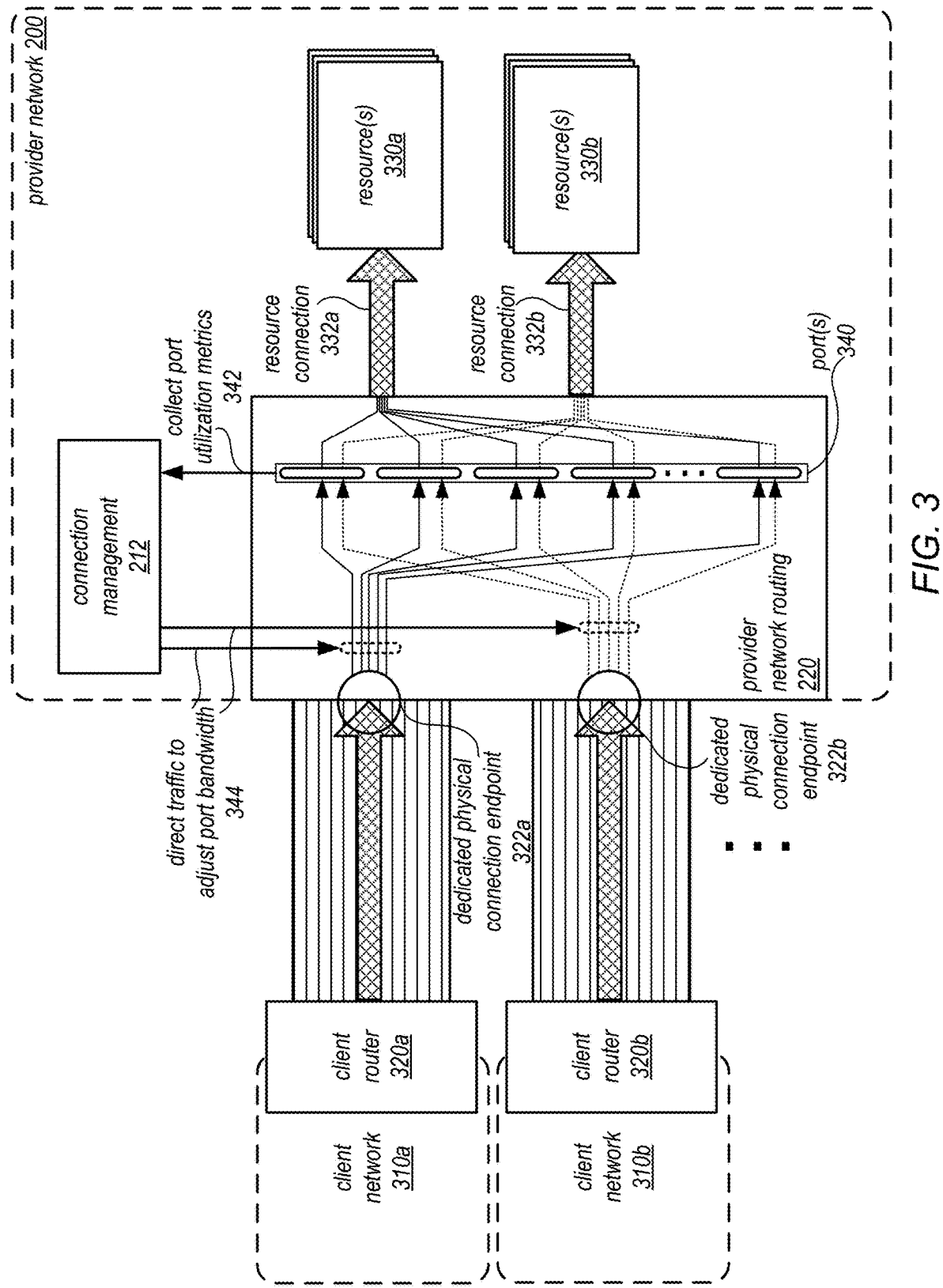
FIG. 3 is a block diagram illustrating a connection manager of a provider network and provider network connection routing to provide dynamic port bandwidth, according to some embodiments.
Figure 8:
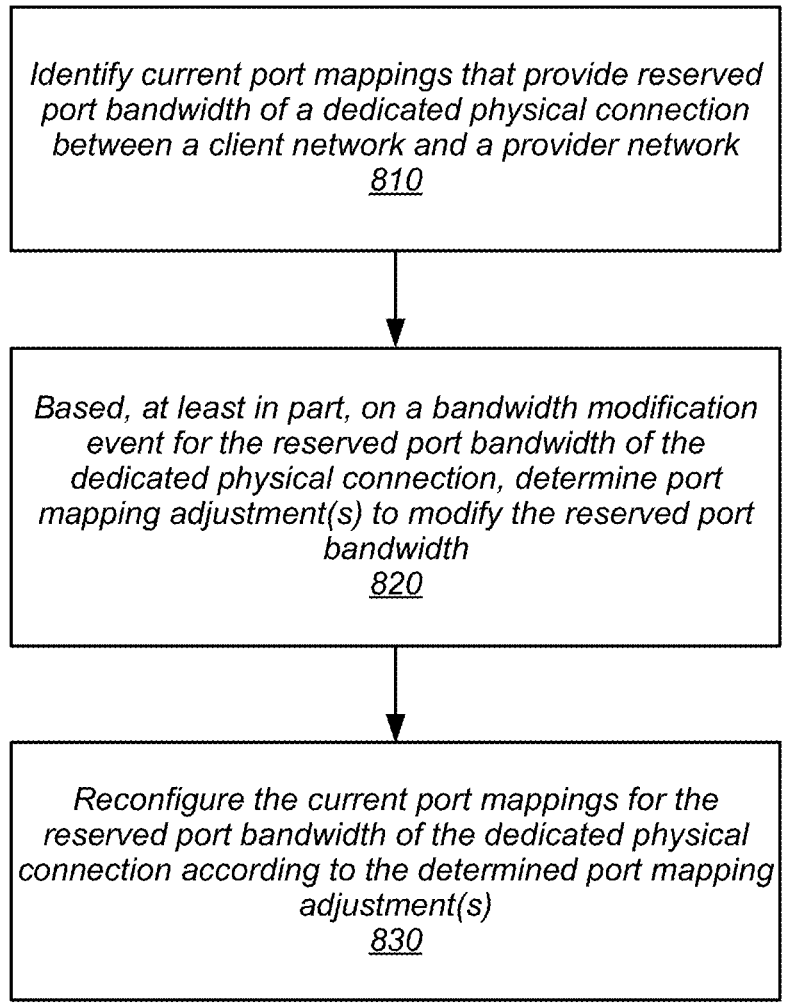
FIG. 8 is a high-level flow chart that illustrates various methods and techniques for provider network routing to dynamically modify port bandwidth for a dedicated physical connection into a provider network, according to some embodiments.

As illustrated in scene 104, in response to detecting the bandwidth modification event for dedicated physical connection 122, dynamic port bandwidth manager 150 may adjust port bandwidth 160 according to the bandwidth modification event. For example, reserved port bandwidth may be increased, guaranteeing greater bandwidth for traffic between provider network 100 and client network 110. To adjust the reserved port bandwidth, provider network routing 130 may be modified to assign, procure, obtain, distribute, arrange, or otherwise provide the dedicated physical connection 122 with the modified port bandwidth 134. FIGS. 3 and 8, discussed in detail below provide many examples of modifying provider network routing to modify reserved port bandwidth for a dedicated physical connection. In at least some embodiments, a client-specified bandwidth adjustment policy may be specified for the dedicated physical connection which may, for instance, indicate a rate or amount of change to be made to port bandwidth (e.g., increase/decrease port bandwidth exponentially). In some embodiments, a default bandwidth adjustment policy may be specified for the provider network to apply when modifying reserved port bandwidth for dedication physical connections to the provider network.

In some embodiments, provider network 100 may implement an interface, which may be programmatic, such as an Application Programming Interface (API), and/or a graphical user interface (GUI). The bandwidth modification policy for dedicated physical connection 122 may be specified via the interface. Modifications to the bandwidth modification policy may also be received via the provider network interface. In at least some embodiments, utilization metrics, such as those collected at 156, may be provided via the interface to a requesting client. Recommendations for modifying, or setting, the bandwidth modification policy may also be provided via the interface, in some embodiments.

Please note that previous descriptions are not intended to be limiting, but are merely provided as an example of provider networks, client networks, physical and resource connections, resources, and routers. The number or arrangement of components, such as the number or arrangement of virtual connections may be implemented in many different ways.

This specification next includes a general description of a provider network, which may implement providing dynamic port bandwidth for dedicated physical connections to a provider network. Then various examples of a provider network are discussed, including different components/modules, or arrangements of components/module that may be employed as part of implementing dynamic bandwidth adjustments for reserved port bandwidth of a dedicated physical connection to a provider network. A number of different methods and techniques to implement providing dynamic port bandwidth for dedicated physical connections to a provider network are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
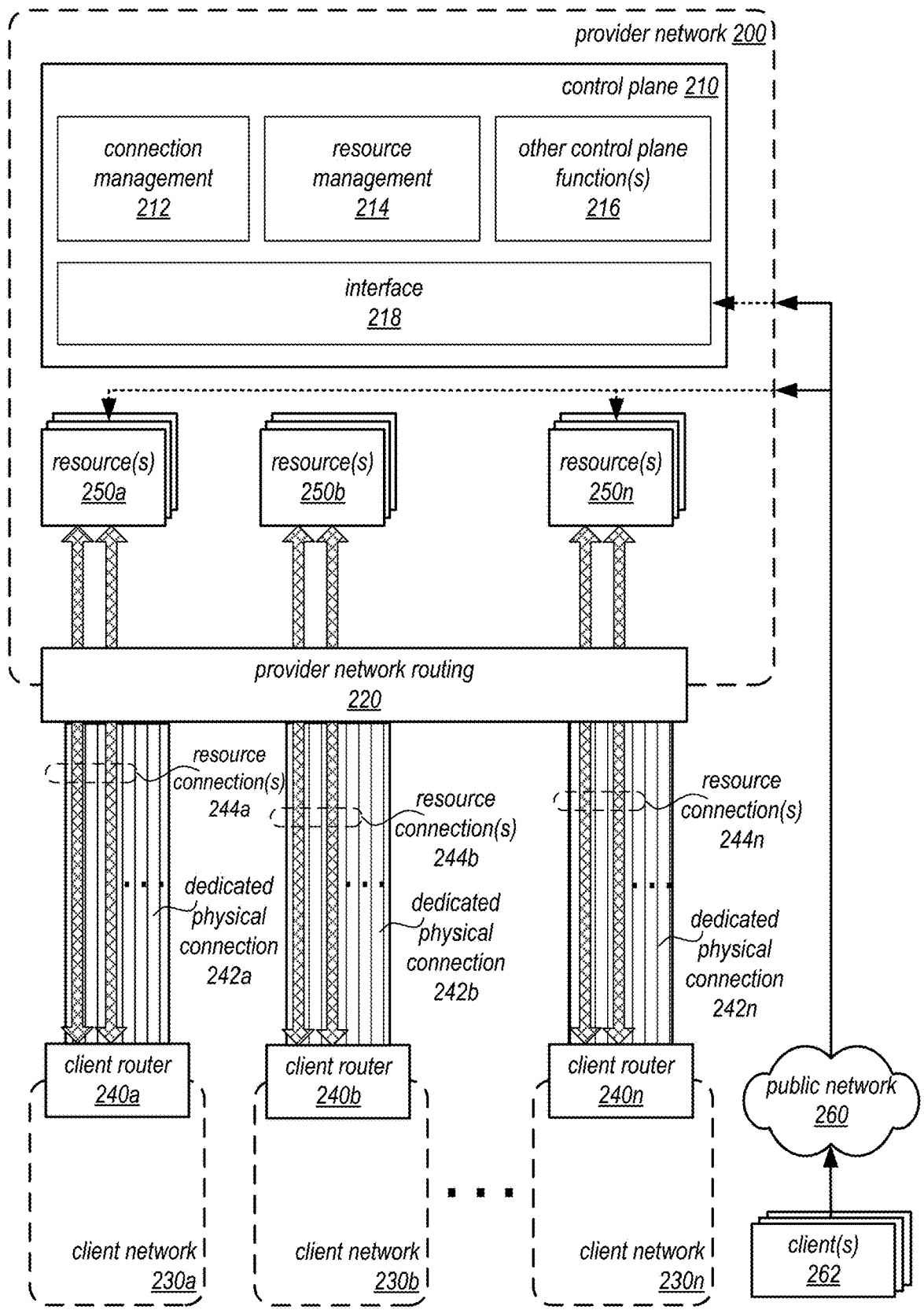
FIG. 2 is a block diagram of a provider network that accepts dedicated physical connections, according to some embodiments.

FIG. 2 is a block diagram of a provider network that accepts dedicated physical connections, according to some embodiments. Provider network 200 may offer various computing resources to clients, such as various types of data analysis, processing, and storage. Computationally intensive applications or systems may utilize multiple distributed computing resources in provider network 200 to provide scalable solutions for a variety of different computing applications. Provider network 200 may be may be set up by an entity such as a company or a public sector organization to provide one or more network-based services (such as various types of cloud-based computing or storage) accessible via a public network 260 (e.g., the Internet) and/or other networks to clients 262. Clients 262 may be configured to access provider network via public network 260, which may ultimately communicate with routers of provider network (not illustrated).

Provider network 200 may include numerous data centers hosting various resource pools, such as collections of physical and/or virtualized computer servers, nodes, storage devices, networking equipment and the like, needed to implement and distribute the infrastructure and services offered by the provider network 200. In at least some embodiments, provider network 200 may implement multiple fault tolerant zones, which may isolate failures to a particular zone such that a failure in or of one fault tolerant zone may not cause or trigger a failure in another fault tolerant zone (allowing computing resources in the other fault tolerant zone to continue operating in the event of a failure of another fault tolerant zone). Different data centers, isolated power or computing infrastructures, and/or other provider network architectures may be implemented to provide multiple fault tolerant zones (sometimes referred to as availability zones). While grouped together in FIG. 2, different resources for a client network, such as resource(s) 250a for client network 230a may be distributed across one or more fault tolerant zones, in some embodiments.

Provider network 200 may include the hardware (e.g., modems, routers, switches, load balancers, proxy servers, etc.) and software (e.g., protocol stacks, accounting software, firewall/security software, etc.) necessary to establish networking links between different components of provider network 200 as well as external networks (e.g., the Internet)

or client networks with dedicated physical connections. In some embodiments, provider network 200 may employ an Internet Protocol (IP) tunneling technology to provide an overlay network via which encapsulated packets may be passed through the provider network 200 using tunnels.

Like provider network 200, a client network 230 may offer or provide various applications or services to users of the client network 230. For example, client networks 230 may be internal networks for various different companies, enterprises or organizations. In some embodiments, client networks 230 may provide publicly available services, which may be accessible via a public network like the Internet. As part of providing the respective services or functions, client networks may utilize various resources offered by provider network 200. In order to enable connectivity between a number of client networks, such as client networks 230a, 230b, and 230n, and multiple resource(s), such as resources 250a, 250b, and 250n, a dedicated physical connection 242 may be implemented. For example, the dedicated physical connection may include one or cables physically linking a pair of co-located routers, one belonging to or managed by the provider network (e.g., provider network routing 220) and one belonging to or managed by a client network (e.g., client router 240a). In at least some embodiments, the provider network router 220 and the client router 240 may be located within a co-location facility. However, in other embodiments the two routers may not be located within a same facility or location. Multiple routing resources and/or devices, such as various hardware and software, may implement provider network routing 220. Thus dedicated physical connections 242 may be connected to multiple network routing resources. However, even if multiple network routing resources are utilized to provide dedicated physical connections 242, traffic from client networks 230 may be directed to and treated as received from a single, respective provider network connection endpoint.

In various embodiments, dedicated physical connections 242 may be utilized to implement one or more multiple resource connections, such as virtual connections 244a, 244b, and 244n. As discussed earlier, a resource connection may be a single connection implemented directly upon the dedicated physical connection 242, that is isolated and processed according to the network path defined by the dedicated physical connection 242 virtual connection may act as an independent connection. A resource connection 244 may be one or more virtual connections (or interfaces) to resources in a provider network, allowing for a single client network to implement multiple different connections for different types of resources in provider network. For example, some resources may be publicly available services, which may also be accessed by clients 262 via public network 260 (as illustrated by the dotted line arrows to resources 250a and 250n). Other resources may be private and may be implemented in an isolated virtual network, and therefore may not be accessible to clients 262 via public network 260 (e.g., resources 250b or any other system, component, or device not within the isolated virtual network). A virtual connection may be implemented to connect a client network 230 with either type of public or private resource. In order to establish a virtual connection, a client 262 associated with a customer account for a particular client network 230 may have to request that the virtual connection be established over the already established dedicated physical connection 242. Various parameters may have to be supplied to an administrative component of provider network 218, such as resource manager 214 in control plane 210, in some embodiments. These parameters may include, for example, one or more of: (a) a VLAN (virtual local area network) identifier or tag that complies with the Ethernet 802.1Q standard, (b) an Internet Protocol (IP) prefix, address range or address, (c) a Border Gateway Protocol (BGP) Autonomous System Number (ASN), or (d) a BGP key. Once established, various systems, components, or devices in client networks 230 may communicate with resources 250 over the respective virtual connections.

Provider network 200 may implement control plane 210 to manage the various resources 250 offered by provider network 200. Control plane 210 may be implemented by various collections servers, nodes, computing systems or devices, such as may be generally described below with regard to computing system 1000 in FIG. 9. Control plane 210 may implement an interface 218, which may be accessible either by client networks 230 over the virtual connections 244, or via public network 260 utilizing clients 262 (which may be associated with client networks 230 or linked to common customer accounts of the different client networks). Interface 218 may handle various requests to procure, reserve, enable, disable, configure, or otherwise manage the resources 250 and/or the various connections to provider network 200 (both physical 242 and virtual 244). For example, interface 218 may provide the various interfaces described below with regard to FIGS. 3-8 for providing and configuring dynamic port bandwidth for dedicated physical connections 242 to provider network 200. Interface 218 may be programmatic, such as may be implemented by an Application Programming Interface (API), and/or a graphical user interface (GUI).

In at least some embodiments, control plane 210 may implement various resource management functions as part of resource manager 214. For example, launching and configuring the various resources 250 may be internally managed and performed by resource manager 214. Other control plane function(s) 216 may also be implemented by control plane 216, and may include authenticating client(s) 262 (e.g., associating them with particular customer accounts), metering resource usage for different client networks, billing customer accounts associated with the client networks, and any other management or control functions to provide the various services of provider network 200. For example, in various embodiments, connection manager 212 may send a notification of an adjustment to reserved port bandwidth for a dedicated physical connection in order to update a billing rate for the dedicated physical connection in response to the modification.

A reserved port bandwidth may, in various embodiments, be allocated to each dedicated physical connection 242. In some embodiments, the reserved port bandwidth may be different for different dedicated physical connections. For instance, a reserved port bandwidth may be 10 Gbps for dedicated physical connection 242a and 4 Gbps for dedicated physical connection 242b. Connection manger 212 may be implemented by provider network 200 in control plane 210 to manage and dynamically modify dedicated physical connections 242 to provider network 200. For example, connection manager may implement the various techniques described above with regard to FIG. 1 and below with regard FIGS. 3-4, and 7-8, for detecting bandwidth modification events for reserved port bandwidth for dedicated physical connections, modifying provider network routing, collecting utilization metrics for the reserved port bandwidth, and providing the utilization metrics for particular dedicated physical connections via interface 218 either to clients 262 associated with the client network 230 of the virtual connection or other components of a client network 230 configured to communicate with interface 218.

In various embodiments, clients 262 may encompass any type of client configurable to manage, operate or configure connections or resources to provider network 200. For example, a given client may implement various tools, scripts, or other modules that may be able to configure a respective physical 242 or resource 244 connection, test the connection, and start or terminate the connection. As part of managing the connections and resources, clients 262 may submit various requests to provider network via interface 218. In order submit requests to provider network 200, a given client 262 may include a suitable version of a web browser, or may include a plug-in module or other type of code module configured to execute as an extension to or within an execution environment provided by a web browser. Alternatively, a client 262 may encompass an application such as a resource/connection management or information client (or user interface thereof) that may make use of provider network 200 to manage various resources and connections. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, client(s) 262 may implement a command line interface to receive textual commands and generate requests to send to provider network 200 via a programmatic interface implemented as part of interface 218 (as well as to receive and translate responses from provider network 200). In some embodiments, clients 262 may be configured to generate network-based services requests according to a Representational State Transfer (REST)-style network-based services architecture, a document- or message-based network-based services architecture, or another suitable network-based services architecture In some embodiments clients 262 may convey requests to provider network 200 via a public network 260, which may be a public connection to provider network 200. In various embodiments, the public network 260 may encompass any suitable combination of networking hardware and protocols necessary to establish network-based communications between clients 262 and provider network 200. For example, a network may generally encompass the various telecommunications networks and service providers that collectively implement the Internet. A network may also include private networks such as local area networks (LANs) or wide area networks (WANs) as well as public or private wireless networks. It is noted that in some embodiments, clients 262 may communicate with provider network 200 using a private network rather than the public Internet.

FIG. 3 is a block diagram illustrating a connection manager of a provider network and provider network connection routing to provide dynamic port bandwidth, according to some embodiments. As discussed above, client networks, such as client networks 310a and 310b, may establish dedicated physical connections to provider network 200. A link may be established from a client router, such as client routers 320a and 320b, to provider network routing 220. Respective resource connections 332a and 332b may be made to make resources 330a and 330b available to client networks 310a and 310b.

Provider network routing 220 may implement various routing resources to receive network traffic from client networks 310 at a dedicated physical connection endpoint 322 and direct the traffic to resource(s) 330 according to a resource connection 332 established over the dedicated physical connection for the client network 310. In at least some embodiments, provider network routing may implement multiple port(s) 340 to provide access to provider network 200 according to respective port bandwidths. Reserved port bandwidth for a dedicated physical connection may be distributed among one or more of port(s) 340. As illustrated in FIG. 3, in some embodiments, reserved port bandwidth for different dedicated physical connections may be distributed to the same port 340 (e.g., traffic from client network 310a, the solid arrow, and 310b, the dotted arrow, may be directed to a same port 340). Thus, provider network routing 220 may provide a many to many configuration for distributing reserved port bandwidth among multiple ports 340.

Port utilization metrics may be collected 342 for different dedicated physical connections, which may be aggregated across the multiple port(s) allocated to provide a portion of the reserved port bandwidth. Connection manager 212 may monitor the utilization metrics, in various embodiments. Based on monitoring the utilization, a bandwidth modification event may be detected for a dedicated physical connection. In at least some embodiments, the bandwidth modification event may be detected according to a bandwidth modification policy, client-specified or a default policy for the provider network. For example, a utilization change (e.g., 20% or increase/decrease of 1 Gbps) may be identified that triggers a bandwidth modification event. The bandwidth utilization policy may also comprise one or more response actions or adjustments to be made to reserved port bandwidth for a dedicated physical connection in response to detecting a bandwidth modification event. Increasing or decreasing reserved port bandwidth, linearly or exponentially, for example, may be described in a bandwidth modification policy. Based on the bandwidth modification event, adjustments may be made to provider network routing to modify provider network routing 220. For example, connection manager 212 may direct to adjust port bandwidth allocated to or reserved for a particular dedicated physical connection at one or more port(s) 340. Even for large changes to reserved port bandwidth, making multiple smaller port bandwidth adjustments at different respective port(s) 340, may in aggregate meet a large change.

Figure 4:
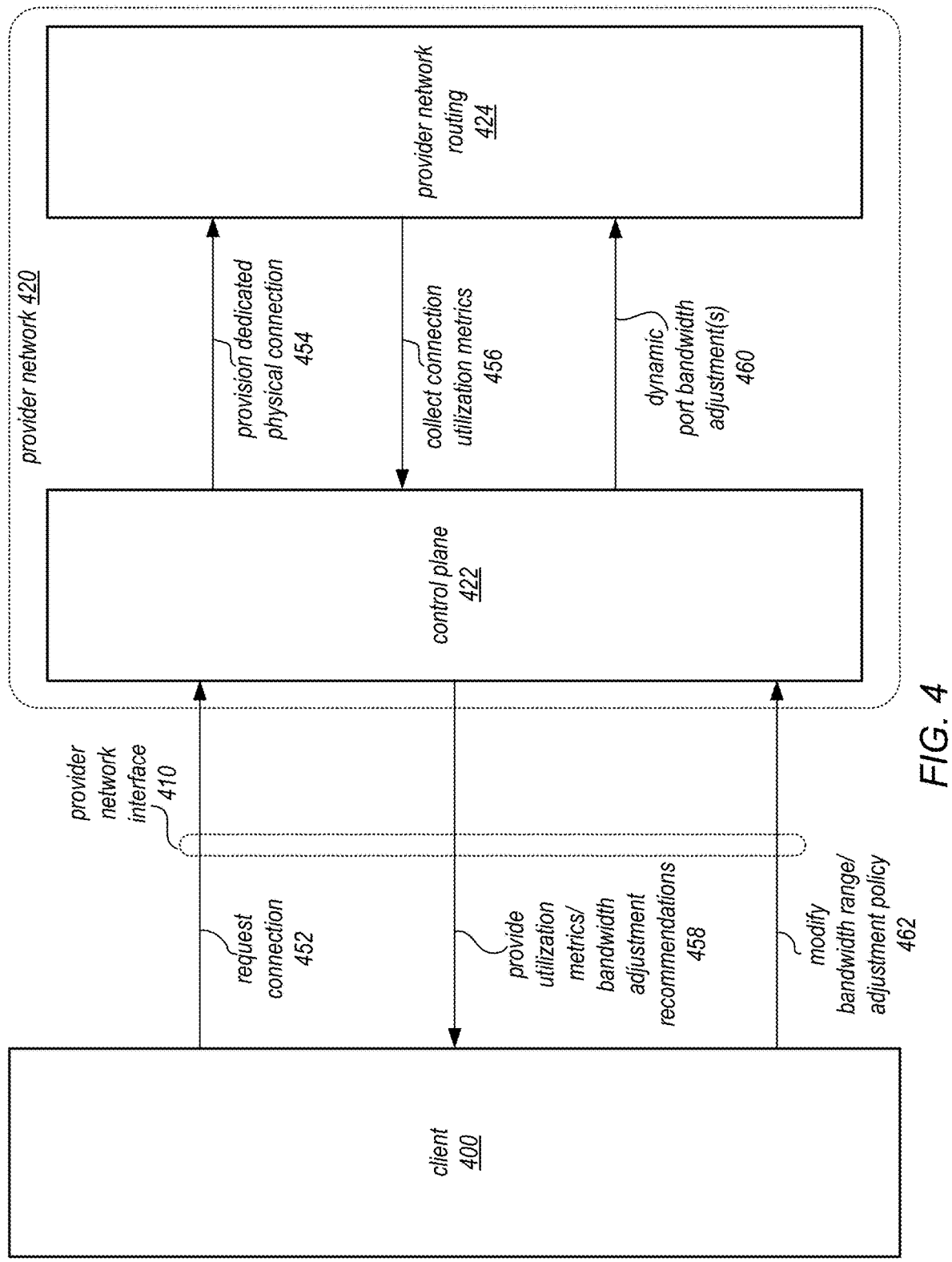
FIG. 4 is a block diagram illustrating interactions between a client and provider network to provision and configure dynamic port bandwidth for a dedicated physical connection to a provider network, according to some embodiments.

FIG. 4 is a block diagram illustrating interactions between a client and provider network to provision and configure dynamic port bandwidth for a dedicated physical connection to a provider network, according to some embodiments. Client 400 may be a client associated with a particular client network, such as client network 440, which may interact with provider network 420 to manage dynamic port bandwidth for a dedicated physical connection from a client network to one or more resources in provider network 420.

Client 400 may send a request 452 to provision/enable a dedicated physical connection from a client network to provider network 420. The request 452 may be received via provider network interface 410 at control plane 422 of provider network 420. Provider network interface 410 may be programmatic, such as an API, and thus request 452 may be formatted according to the programmatic interface. The request may specify information identifying the particular dedicated physical connection (e.g., a connection identifier), an initial reserved port bandwidth, client-side routing information, and/or any other information to perform virtual connection diagnostics. In at least some embodiments, request 452 may include a client-specified bandwidth adjustment policy for the requested dedicated physical connection.

In response to receiving the request, control plane 422 may configure, set-up, establish, or otherwise provision the dedicated physical connection 454 at provider network routing 424. An initial reserved port bandwidth may be initially configured at provider network routing 424 (e.g., allocating portions of one or more ports in provider network routing to equal the initial reserved port bandwidth). Once established, the dedicated physical connection may provide access to resources located in provider network for the client network. Control plane 422 may also begin collecting connection utilization metrics 456 from the utilization of port bandwidths in provider network routing 220 for the dedicated physical connection.

Over time utilization metrics for the reserved port bandwidth for a dedicated physical control plane may be collected 456. In some embodiments, the utilization metrics may be provided to client 400 via provider network interface 410. Bandwidth adjustment recommendations for a dedicated physical connection may also be provided, in indicating, for instance, changes to a bandwidth modification policy. Changes or modifications to modify the bandwidth adjustment policy 462 may be received via provider network interface 410. In at least some embodiments, a range or thresholds/limits between which the reserved port bandwidth may vary according to bandwidth modification events may be received (e.g., 8 Gbps max, 2-6 Gbps). However, note that in some embodiments, no limit or threshold for reserved port bandwidth modifications may be enforced. The utilization of the reserved port bandwidth and may be monitored. Based on the monitoring, a bandwidth modification event may be triggered. Dynamic port bandwidth adjustment(s) 460 may be sent to adjust/modify provider network routing 424 to change the reserved port bandwidth according to the bandwidth modification event.

Figure 5:
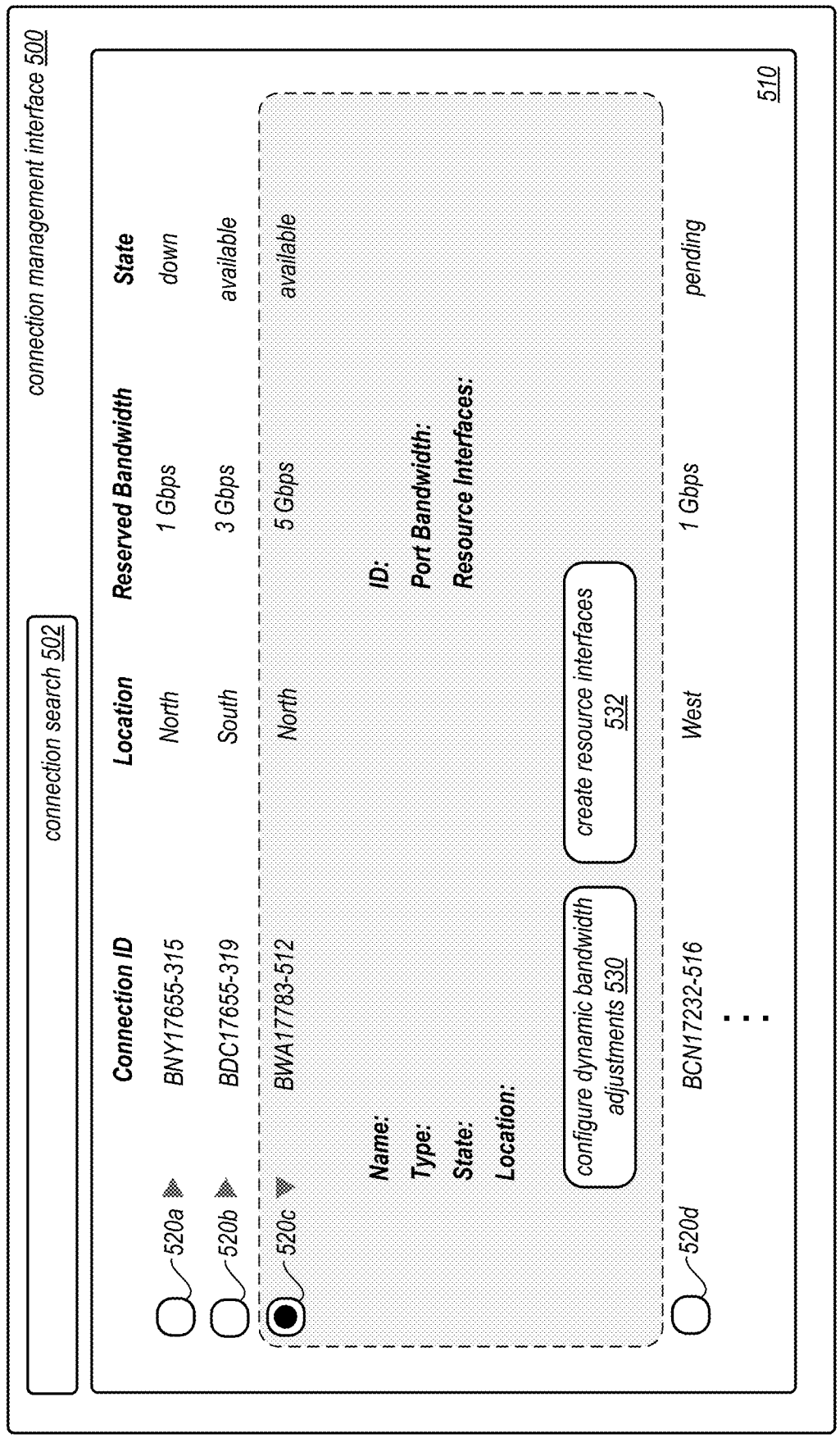
FIG. 5 is a diagram illustrating a graphical user interface for configuring dynamic port bandwidth for a dedicated physical connection to a provider network, according to various embodiments.

An interface for a provider network may be implemented in many different ways. As discussed above with regard to FIG. 4, a programmatic interface may be implemented which a client associated with a client network may interact. A graphical user interface may also be implemented in some embodiments. For example, a web site may be implemented that allows a client to enable, disable, and/or request diagnostic metrics for a particular virtual connection. FIG. 5 is a diagram illustrating a graphical user interface for configuring dynamic port bandwidth for a dedicated physical connection to a provider network, according to various embodiments.

Connection management interface 500 may be a graphical user interface provided by a provider network for managing dynamic port bandwidth for dedicated physical connections to a provider network. In at least some embodiments, a discovery mechanism, such as connection search element 502 may be implemented to enable the discovery of connections for which reserved port bandwidth may be managed. For example, in some embodiments, a client network (or multiple client networks associated with a same customer account) may have a large number of dedicated connections into a provider network, and thus, a user may input a search of a particular ID, name, description, or other identifying information to locate the particular connection for managing the dynamic port bandwidth reserved for the particular connection.

As illustrated in FIG. 5, virtual connection diagnostic interface 400 may implement a display element 510 which lists different dedicated physical connections for which the dynamic provision of reserved port bandwidth may be determined. For example, user interface elements corresponding to different dedicated physical connections such as elements 520*a*, 520*b*, 520*c*, and 520*d* (which correspond to dedicated physical connections BNY17655-315, BDC17655-319, BWA17783-512, and BCN17232-516 respectively), may be selected to provide further details about the dedicated physical connection and provide further user interface elements to configure dynamic port bandwidth and/or create resource interfaces (e.g., virtual connections). For example, as illustrated in FIG. 5, element 520*c* is selected, providing further details for virtual connection BWA17783-512. For example, a connection name, type (e.g., public or private), state (e.g., down, available, pending), location (e.g., provider network connection endpoint location), routing information, an ID, reserved port bandwidth, and information about resource interfaces implemented over the dedicated physical connection may be provided in a detailed view of the virtual connection. Configure dynamic bandwidth adjustments interface element 530 may be provided to set or modify dynamic port bandwidth for BWA17783-512. If selected, then the various interactions described above with regard to FIG. 4, such as modifications or changes to a bandwidth modification policy for the dedicated physical connection may be performed.

Figure 6:
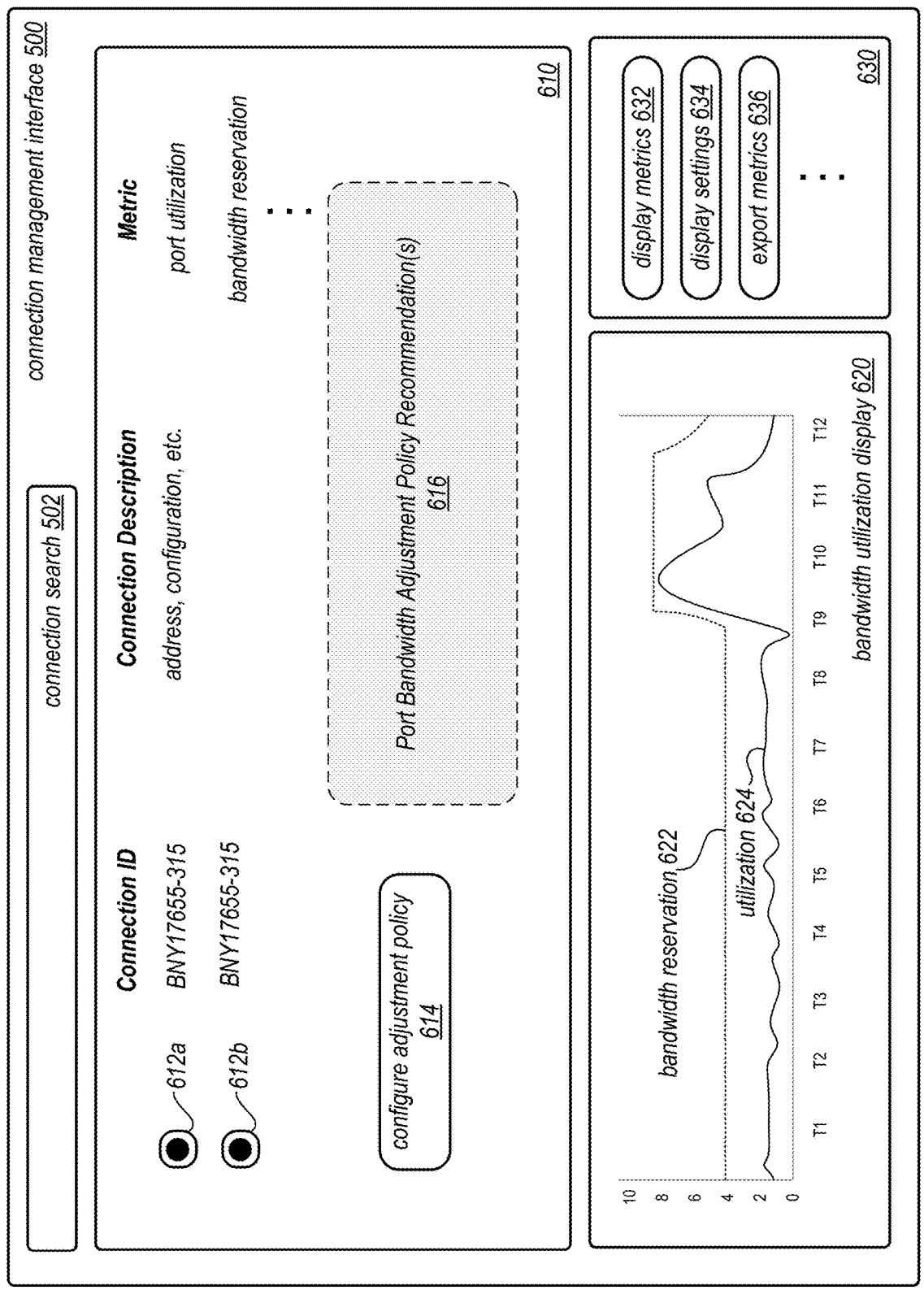
FIG. 6 is a diagram illustrating a graphical user interface for accessing port utilization metrics for a dedicated physical connection to a provider network, according to various embodiments.

In addition to providing a graphical user interface for enabling/disabling virtual connections, a graphical user interface may be implemented to provide utilization metrics for different dedicated physical connections to a provider network. FIG. 6 is a diagram illustrating a graphical user interface for accessing port utilization metrics for a dedicated physical connection to a provider network, according to various embodiments. Connection management interface 500 may implement metric selection element 610, which may display various dedicated physical connections associated with a customer account along with particular metrics that may be provided. For example, dedicated physical connection BNY17655-315 is illustrated as providing at least a port utilization metric, and a port bandwidth reservation metric for the dedicated physical connection. User interface elements 612*a* and 612*b* (e.g., radio or checkbox selection elements) may allow a user to select one or more metrics for display. In some embodiments, multiple dedicated physical connections may be selected for displaying metrics.

In some embodiments, port bandwidth adjustment policy recommendation(s) may be displayed at element 616. For example, a particular scaling model or other set of instructions for adjusting port bandwidth for the dedicated physical connection may be displayed. A user interface element, 614, may also be displayed, which if selected may allow the bandwidth adjustment policy for the dedicated physical connection to be configured (e.g., according to the provided recommendation).

In at least some embodiments, connection management interface 500 may implement a metric display and configuration menu 630 which may allow a user to display, modify, or otherwise interact with utilization metrics provided in bandwidth utilization display element 620. A display metrics element may instigate the display of selected metrics (e.g., from 612*a* and 612*b*). For example, a request may be formatted in response to the selection of element display metrics 632 according to a programmatic interface for the provider network, to request the selected utilization metrics, which may then be retrieved/generated for display. In at least some embodiments display settings element 634 may be used to adjust or modify the way in which the metrics are displayed in display element 620. For example, the format of display may change from a graph (as illustrated) to a numerical display. In some embodiments, display settings

634 may allow diagnostic metric display 620 to be updated dynamically, providing a real-time view of changes in utilization 624, bandwidth reservation 622, or any other metric collected for a dedicated physical connection. In at least some embodiments, a selection of user interface element 636 may trigger a download or other kind of export of the selected utilization metrics.

Note, that the example graphical user interfaces illustrated in discussed above with regard to FIGS. 5 and 6 are merely provided as examples of a graphical user interface for diagnostic metric collection and provision, and thus are not intended to be limiting.

Figure 7:
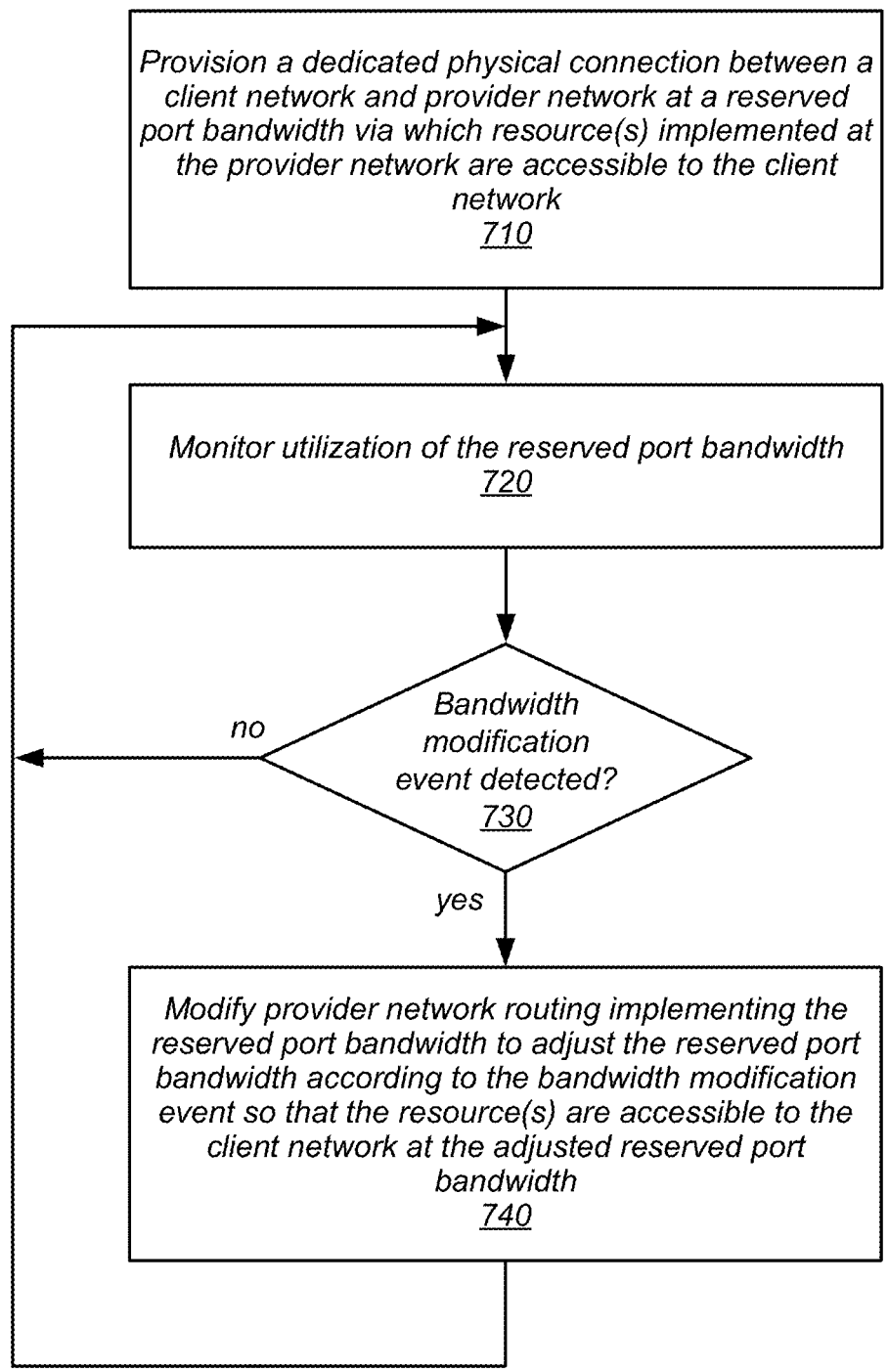
FIG. 7 is a high-level flow chart that illustrates various methods and techniques for providing dynamic port bandwidth for a dedicated physical connection into a provider network, according to various embodiments.

The examples of implementing providing dynamic port bandwidth for a dedicated physical connection to a provider network discussed above with regard to FIGS. 2-6 have been given in regard to a particular provider network. Various other types or configurations of a provider network may implement these techniques. The interface, physical dedicated connection, computing services or resources, or any other component of the provider network, or client network, may be differently implemented. FIG. 7 is a high-level flow chart that illustrates various methods and techniques for providing dynamic port bandwidth for a dedicated physical connection into a provider network, according to various embodiments. These techniques may be implemented using various components of a provider network as described above with regard to FIGS. 2-6 or other provider network components.

As indicated at 710, a dedicated physical connection may be provisioned or established between a client network and a provider network at a reserved port bandwidth via which resource(s) implemented at the provider network accessible to the client network. The reserved port bandwidth may be initially specified when creating/establishing the dedicated physical connection (or may be set at some default value for dedicated physical connections to the provider network). In some embodiments, a range, limit(s), or other threshold may be set for the reserved port bandwidth above and/or below which the reserved port bandwidth may not exceed.

Client networks may begin utilizing the established dedicated physical network to access resources maintained in the provider network. In at least some embodiments, resource connections, such as virtual connections, may be created over the dedicated physical connection, to the resources in the provider network. As traffic/interactions between the resources and the client network occur, reserved port bandwidth for the dedicated physical connection is utilized. As indicated at 720, the utilization of the reserved port bandwidth may be monitored, in various embodiments. For example, various alarms, limits, or thresholds may be implemented for utilization of the reserved port bandwidth. In some embodiments, these alarms, limits, or thresholds may be specified by a bandwidth adjustment policy, while in other embodiments, the provider network or client may specify particular ones. If the utilization of the reserved port bandwidth exceeds, falls below, or otherwise satisfies the conditions of the alarms, limits, or thresholds, then a bandwidth modification event may be detected. For example, reserved port bandwidth may be provided across multiple different ports implemented for provider network routing. As the individual port bandwidth utilizations for the multiple different ports are aggregated, it may be determined whether total port bandwidth utilization satisfies some alarm, limit, or threshold.

Please note, that in some embodiments, bandwidth modification events may be triggered by different events than those based on utilization of the reserved port bandwidth for the dedicated physical connection. For instance, bandwidth modification events for other dedicated physical connections mapped to one or more of the same ports in provider network routing may trigger changes in allocation/mappings to the dedicated physical connection. The addition of new provider network routing resources (e.g., additional routers or switches) may trigger changes in the way that reserved port bandwidth is allocated, as can the removal of provider network routing resources. Thus, the previous examples of triggering a bandwidth modification event are not intended to be limiting.

As indicated by the negative exit from 730, if no bandwidth modification event is detected, then monitoring of the utilization of the reserved port bandwidth may continue. If, however, a bandwidth modification event is detected, as indicated by the positive exit from 730, then provider network routing implementing the reserved port bandwidth may be modified to adjust the reserved port bandwidth according to the bandwidth modification event, as indicated at 740, in various embodiments. The modification may be performed so that the resource(s) in the provider network are accessible at the adjusted reserved port bandwidth. Routing and/or network traffic controllers may for instance, be modified to direct traffic to port(s) in provider network routing according to a modified allocation scheme that corresponds to the adjusted port bandwidth. For example, in some embodiments, a dedicated physical connection may be mapped to a single port that has available port bandwidth capacity to handle an increase in reserved port bandwidth for the dedicated physical connection. Likewise, a decrease in reserved port bandwidth may be performed at the single port.

In at least some embodiments, multiple ports implemented as part of a provider network routing (as illustrated in FIG. 3) may be used to provide reserved port bandwidth for a dedicated physical connection. FIG. 8 is a high-level flow chart that illustrates various methods and techniques for provider network routing to dynamically modify port bandwidth for a dedicated physical connection into a provider network, according to some embodiments. As indicated at 810, current port mappings to one or more ports that provide reserved port bandwidth of a dedicated physical connection between a client network and provider network may be identified. A routing table, for instance, or other metadata may maintain current port assignments, as well the bandwidth allocations of the respective ports to the dedicated physical connection. Consider the example where dedicated physical connection A is mapped to port 2040 at 1 Gbps, port 2041 at 2 Gbps, port 2042 at 1 Gbps, and port 2043 at 500 Mbps. The total reserved port bandwidth allocated to dedicated physical connection A is 4.5 Gbps.

As indicated at 820, based, at least in part, on the bandwidth modification event for the reserved port bandwidth of the dedicated physical connection, port mapping adjustment(s) to modify the reserved port bandwidth may be determined. For instance, a change to reserved port bandwidth may be identified (e.g., an increase/decrease). As mentioned above, a bandwidth adjustment policy may specify the amount of the increase or decrease (e.g., 1 Gbps). Ports may be multi-tenant, providing port bandwidth for other dedicated physical connections to the provider network, in some embodiments. Thus, the current mappings and allocations to the different ports may be evaluated, as well as mappings and allocations for other dedicated physical connections to the different ports. If additional port bandwidth is to be reserved, for example, then available bandwidth may be found at one of the ports already mapped to the dedicated physical connection. In at least some embodiments, new/different ports may be mapped to the dedicated physical connection, while some current ports may be removed. The different port mapping adjustments may therefore specify changes to current mappings as well as create new mappings in order to modify the reserved port bandwidth.

As indicated at 830, the current port mappings may be reconfigured for the reserved port bandwidth of the dedicated physical connection according to the port mapping adjustment(s). For example, as mentioned above, a routing table or other metadata at a traffic controller may be updated to reflect updated port mappings, including updated port bandwidth allocations. In at least some embodiments, additional ports may be connected to a physical dedicated connection (even though they may not be currently enabled/used for the dedicated physical connection). Thus, adding/removing ports may be enabling/disabling connected ports. In this way, adjusted port bandwidth in some embodiments, may be performed without manually or physically adding or removing ports to a dedicated physical connection.

The various methods and techniques described above with regard to FIGS. 7 and 8 may be repeated multiple times for a same dedicated physical connection and/or for multiple dedicated physical connections to a provider network. In this way, the reserved port bandwidth for the dedicated physical connection may be tuned to the current needs of the client network. Moreover, the provider network may more efficiently utilize network routing resources to allow for more dedicated physical connections and/or greater reserved port bandwidth for client networks. In at least some embodiments, the provider network offers network-based services (such as described above with regard to FIG. 2), and thus tuning the reserved port bandwidth for dedicated physical connections may increase cost savings for client networks, and provide for additional capacity to utilize network-based services at a provider network, generating more revenue for provider networks.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the router data service described herein). The various methods as illustrated in the figures and described herein represent example embodiments of methods. The order of any method may be changed, and various elements may be added, reordered, combined, omitted, modified, etc.

Figure 9:
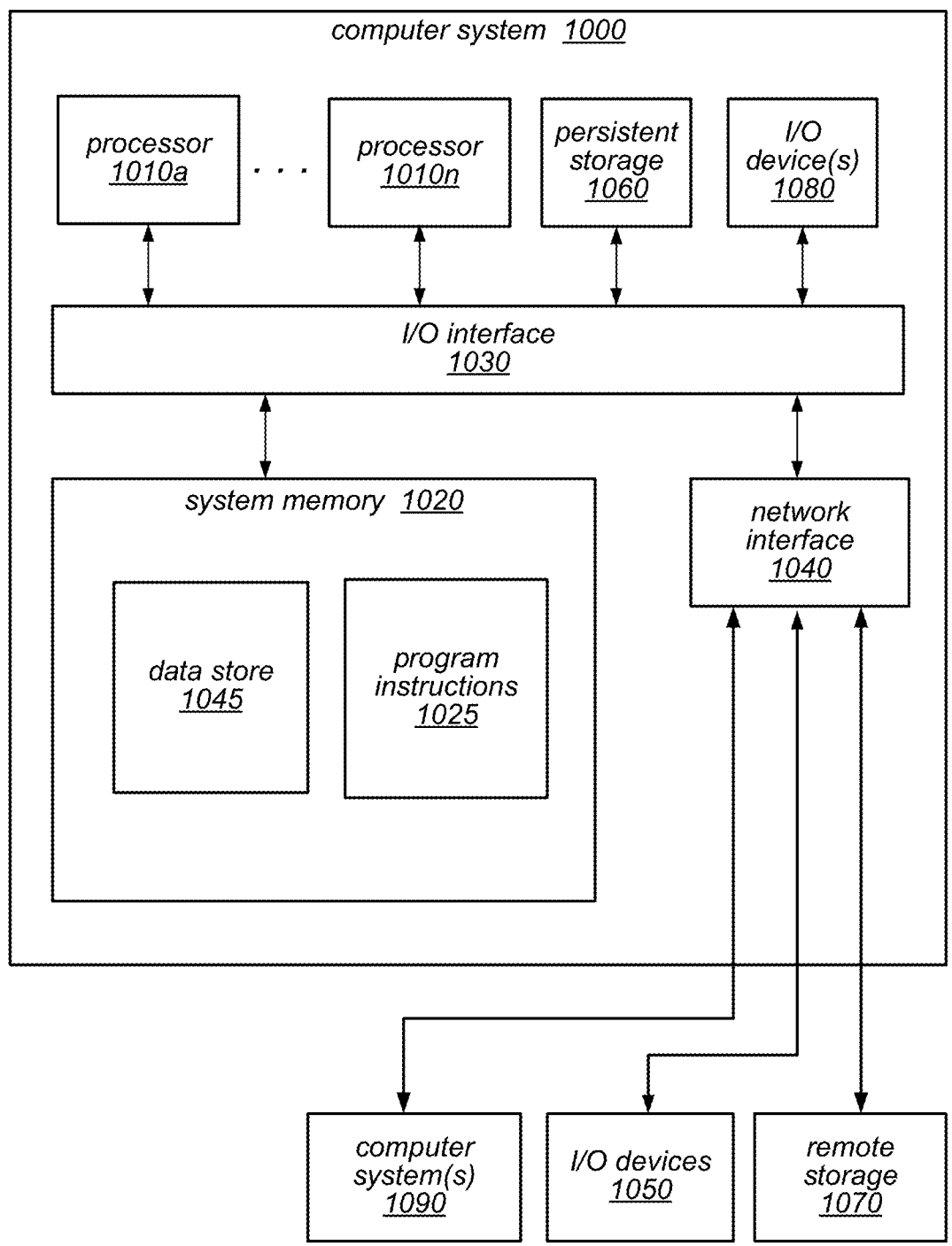
FIG. 9 is a block diagram illustrating an example computing system, according to some embodiments.

Embodiments of providing dynamic port bandwidth for a dedicated physical connection to a provider network as described herein may be executed on one or more computer systems, which may interact with various other devices. FIG. 9 is a block diagram illustrating an example computer system, according to various embodiments. For example, computer system 1000 may be configured to implement nodes of a provider network, such as may implement various resources, a control plane, provider network routing, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the system described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a provider network, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more nodes, endpoints, systems, or services internal to or external to a provider network, and/or clients of the provider network described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
    a plurality of compute nodes that together implement a provider network that provides one or more computing resources for a client;
    a dedicated physical connection endpoint to connect a client network of the client to the provider network, wherein the one or more computing resources are accessible to the client network via the dedicated physical connection endpoint according to a port bandwidth reserved for the dedicated physical connection endpoint, wherein the dedicated physical connection endpoint is directly connected to a router of the client network via a directly connected cable;
    one or more routers of the provider network connected to the dedicated physical connection endpoint via one or more multi-tenant ports of the one or more routers, wherein more than one dedicated physical connection is mapped to respective ones of the one or more multi-tenant ports of the one or more routers,
    wherein one or more of the plurality of compute nodes of the provider network implement a provider network interface configured to:
        receive a client-specified bandwidth modification policy for the dedicated physical connection endpoint, wherein the client-specified bandwidth modification policy comprises:
            a client-specified rate at which reserved port bandwidth is to be adjusted in response to detection of a bandwidth modification event; and
            a client-specified limit for adjusted reserved port bandwidth that is not to be exceeded when the reserved port bandwidth is adjusted according to the client-specified rate;
    wherein one or more of the plurality of compute nodes of the provider network implement a connection manager configured to:
        monitor utilization of the port bandwidth reserved for the dedicated physical connection endpoint;
        detect, based, at least in part, on the monitorship of the utilization, a bandwidth modification event for the port bandwidth reserved for the dedicated physical connection endpoint; and
        adjust a mapping for the dedicated physical connection endpoint to modify the port bandwidth for the dedicated physical connection endpoint such that the one or more computing resources are accessible to the client network according to an adjusted port bandwidth for the dedicated physical connection endpoint, wherein the adjusted port mapping for the dedicated physical connection endpoint adds or removes bandwidth in accordance with the client-specified rate and the client-specified limit included in the client-specified bandwidth modification policy, and wherein a billing rate for the dedicated physical connection endpoint is adjusted according to the adjusted port bandwidth.

2. The system of claim 1, wherein to adjust the mapping to modify the port bandwidth for the dedicated physical connection endpoint, the connection manager is configured to:
    identify one or more current mappings to one or more multi-tenant ports of the one or more routers of the provider network that provide the reserved port bandwidth for the dedicated physical connection endpoint;
    determine one or more mapping adjustments to the one or more current mappings to modify the reserved port bandwidth for the dedicated physical connection endpoint based, at least in part, on the bandwidth modification event; and
    reconfigure the one or more current mappings to the one or more multi-tenant ports of the one or more routers of the provider network according to the one or more mapping adjustments.

3. The system of claim 1, further comprising:
    a provider network control plane that includes the connection manager;
    wherein the provider network offers a plurality of network-based services, wherein the one or more computing resources are implemented as part of at least one of the plurality of network-based services, wherein the client network is associated with a particular customer account of the provider network; and
    wherein the provider network control plane is configured to:
        in response to the detection of the bandwidth modification event, modify the billing rate for the dedicated physical connection endpoint according to the adjusted port bandwidth.

4. A method, comprising:
    providing a dedicated physical connection endpoint of a provider network to a client, wherein the dedicated physical connection endpoint is directly connected to a router of a client network of the client via a directly connected cable, and wherein one or more routers of the provider network are connected to the dedicated physical connection endpoint via one or more multi-tenant ports of the one or more routers; and
    performing, by one or more computing devices:
        receiving a client-specified bandwidth modification policy for the dedicated physical connection endpoint, wherein the client-specified bandwidth modification policy comprises:
            a client-specified rate at which reserved port bandwidth is to be adjusted in response to detection of a bandwidth modification event; and
            a client-specified limit for adjusted reserved port bandwidth that is not to be exceeded when the reserved port bandwidth is adjusted according to the client-specified rate;
        detecting a bandwidth modification event for port bandwidth reserved for the dedicated physical connection endpoint, wherein the provider network implements one or more resources accessible to the client network via the dedicated physical connection endpoint according to the port bandwidth reserved for the dedicated physical connection endpoint; and
        adjusting a mapping between the dedicated physical connection endpoint and the one or more multi-tenant ports of the one or more routers of the provider network to modify the port bandwidth reserved for the dedicated physical connection endpoint such that the one or more resources are accessible to the client network according to the adjusted port bandwidth, wherein the adjusted mapping for the dedicated physical connection endpoint adds or removes bandwidth in accordance with the client-specified rate and the client-specified limit included in the client-specified bandwidth modification policy, and wherein a billing rate for the dedicated physical connection endpoint is adjusted according to adjusted port bandwidth.

5. The method of claim 4, wherein the client-specified bandwidth modification policy for the dedicated physical connection endpoint is received via a programmatic interface for the provider network.

6. The method of claim 4, further comprising:
monitoring utilization of the port bandwidth reserved for the dedicated physical connection endpoint between the client network and the provider network; and
wherein detecting the bandwidth modification event is based, at least in part, on the monitoring of the utilization of the port bandwidth.

7. The method of claim 4, wherein adjusting the mapping to modify the port bandwidth according to the client-specified bandwidth modification policy comprises:
identifying one or more current mappings to one or more of the one or more multi-tenant ports of the one or more routers of the provider network that provide the reserved port bandwidth for the dedicated physical connection endpoint;
determining one or more mapping adjustments to the one or more current mappings to modify the reserved port bandwidth based, at least in part, on the bandwidth modification event; and
reconfiguring the one or more current mappings to the one or more multi-tenant ports of the one or more routers of the provider network according to the one or more mapping adjustments.

8. The method of claim 7, wherein determining the one or more mapping adjustments to the one or more current mappings to modify the reserved port bandwidth is further based on one or more other mappings to at least one of the one or more multi-tenant ports of the one or more routers of the provider network for a different dedicated physical connection endpoint for another client network.

9. The method of claim 4, wherein adjusting the mapping to modify the port bandwidth increases or decreases the port bandwidth reserved for the dedicated physical connection endpoint.

10. A non-transitory, computer-readable storage medium, storing program instructions that when executed by one or more computing devices cause the one or more computing devices to:
implement a provider network interface configured to:
receive a client-specified bandwidth modification policy for a dedicated physical connection endpoint of a provider network, wherein the client-specified bandwidth modification policy comprises:
a client-specified rate at which reserved port bandwidth is to be adjusted in response to detection of a bandwidth modification event; and
a client-specified limit for adjusted reserved port bandwidth that is not to be exceeded when the reserved port bandwidth is adjusted according to the client-specified rate;
monitor utilization of port bandwidth reserved for the dedicated physical connection endpoint of the provider network, wherein the provider network implements one or more resources accessible to a client network via the dedicated physical connection endpoint according to the port bandwidth reserved for the dedicated physical connection endpoint, wherein the dedicated physical connection endpoint is directly connected to a router of the client network via a directly connected cable, and wherein one or more routers of the provider network are connected to the dedicated physical connection endpoint via one or more multi-tenant ports of the one or more routers;
detect based, at least in part, on the monitoring of the utilization, a bandwidth modification event for the port bandwidth reserved for the dedicated physical connection endpoint; and
cause a mapping between the dedicated physical connection endpoint and the one or more multi-tenant ports of the one or more routers to be adjusted to modify the port bandwidth such that the one or more resources are accessible to the client network according to an adjusted port bandwidth, wherein an adjusted mapping for the dedicated physical connection endpoint adds or removes bandwidth in accordance with the client-specified rate and the client-specified limit included in the client-specified bandwidth modification policy, and wherein a billing rate for the dedicated physical connection endpoint is adjusted according to adjusted port bandwidth.

11. The non-transitory, computer-readable storage medium of claim 10, wherein the program instructions cause the one or more computing devices to:
provide to a client associated with the client network, via the provider network interface, a bandwidth modification policy recommendation based, at least in part, on the monitoring of the utilization of the port bandwidth reserved for the dedicated physical connection endpoint of the provider network.

12. The non-transitory, computer-readable storage medium of claim 10, wherein the provider network interface is a graphical user interface.

13. The non-transitory, computer-readable storage medium of claim 10, wherein the program instructions cause the one or more computing devices to:
provide to a client associated with the client network, via the provider network interface, one or more utilization metrics of the port bandwidth reserved for the dedicated physical connection endpoint of the provider network based, at least in part, on the monitoring of the utilization of the port bandwidth.

14. The non-transitory, computer-readable storage medium of claim 10, wherein, in causing the mapping to be adjusted to modify the port bandwidth, the program instructions cause the one or more computing devices to:
identify one or more current mappings to one or more multi-tenant ports of the one or more routers of the provider network that provide the reserved port bandwidth for the dedicated physical connection endpoint;
determine one or more mapping adjustments to the one or more current mappings to modify the reserved port bandwidth based, at least in part, on the bandwidth modification event; and
reconfigure the one or more current mappings to the one or more multi-tenant ports of the one or more routers of the provider network for the dedicated physical connection endpoint according to the one or more mapping adjustments.

15. The non-transitory, computer-readable storage medium of claim 10, wherein the provider network offers a plurality of network-based services, wherein the one or more resources are implemented as part of at least one of the plurality of network-based services, wherein the client network is associated with a particular customer account of the provider network, and wherein the program instructions cause the one or more computing devices to:

modify, in response to detecting the bandwidth modification event, the billing rate charged to the particular customer account for the dedicated physical connection endpoint according to the adjusted port bandwidth.

\* \* \* \* \*